(12) United States Patent
Lin et al.

(10) Patent No.: US 8,244,651 B1
(45) Date of Patent: Aug. 14, 2012

(54) SUGGESTING TRAINING EXAMPLES

(75) Inventors: Wei-Hao Lin, New York, NY (US); Travis H. K. Green, New York, NY (US); Robert Kaplow, New York, NY (US); Gang Fu, Kearny, NJ (US); Gideon S. Mann, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/245,688

(22) Filed: Sep. 26, 2011

Related U.S. Application Data

(63) Continuation of application No. 13/228,365, filed on Sep. 8, 2011.

(60) Provisional application No. 61/497,481, filed on Jun. 15, 2011.

(51) Int. Cl.
*G06F 15/18* (2006.01)

(52) U.S. Cl. ............................ 706/14; 706/12

(58) Field of Classification Search .................. None
See application file for complete search history.

(56) References Cited

U.S. PATENT DOCUMENTS

| | | | |
|---|---|---|---|
| 7,349,919 B2 | 3/2008 | Russell et al. | |
| 7,689,520 B2* | 3/2010 | Burges et al. | 706/12 |
| 2002/0099730 A1* | 7/2002 | Brown et al. | 707/500 |
| 2003/0212851 A1 | 11/2003 | Drescher et al. | |
| 2005/0234753 A1 | 10/2005 | Pinto et al. | |
| 2009/0106178 A1 | 4/2009 | Chu | |
| 2011/0145175 A1* | 6/2011 | Agarwal | 706/12 |
| 2011/0289025 A1* | 11/2011 | Yan et al. | 706/12 |

OTHER PUBLICATIONS

Duchi, John, et al., "Boosting with Structural Sparsity", 2009, cs.berkeley.edu [online]. [Retrieved on Jan. 25, 2011]. Retrieved from the Internet: <URL: http://www.cs.berkeley.edu/~jduchi/projects/DuchiSi09d.pdf>, 41 pages.
Duchi, John, et al., "Boosting with Structural Sparsity", Proceedings of the 26th International Conference on Machine Learning, Montreal, Canada, 2009, cs.berkeley.edu [online]. [Retrieved on Jan. 25, 2011]. Retrieved from the Internet: <URL: http://www.cs.berkeley.edu/~jduchi/projects/DuchiSi09a.pdf>, 8 pages.
R-Project web pages, 190 pages [online]. [Retrieved on May 18, 2010]. Retrieved from the Internet: <URL: http://www.r-project.org/>, 190 pages.
Uclassify web pages, [online]. [Retrieved on May 18, 2010]. Retrieved from the Internet: <URL: http://www.uclassify.com/>, 16 pages.

(Continued)

*Primary Examiner* — Omar Fernandez Rivas
*Assistant Examiner* — Daniel Pellett
(74) *Attorney, Agent, or Firm* — Fish & Richardson P.C.

(57) ABSTRACT

Methods, systems, and apparatus, including computer programs encoded on a computer storage medium, for suggesting training examples. In one aspect, a method includes receiving a plurality of training examples. A plurality of different types of predictive models are trained using the received training examples, wherein each of the predictive models implements a different machine learning technique. The performance of each trained model is measured. A suggestion score is computed for each training example according to each respective trained model, including weighting each suggestion score by the measured performance of the respective trained model. The computed suggestion scores for each training example are combined to compute an overall suggestion score for each training example, and the training examples are ranked by suggestion scores.

27 Claims, 4 Drawing Sheets

OTHER PUBLICATIONS

Zementis web pages [online]. [Retrieved on May 18, 2010]. Retrieved from the Internet: <URL: http://www.zementis.com/>, 34 pages.

Weiss, Integrating Real-Time Predictive Analytics into SAP Applications [online], Dec. 30, 2009 [retrieved on Sep. 29, 2011], Retrieved from the Internet: ,URL:http://www.sdn.sap.com/irj/scn/go/portal/prtroot/docs/library/uuid/a07faefd-61d7-2c10-bba6-89ac5ffc302c?QuickLink=index&overridelayout=true>.

Hutter, et al., "Performance Prediction and Automated Tuning of Randomized and Parametric Algorithms,", Principles and Practice of Constraint Programing, Lecture Notes in Computer Science, 2006, 15 pages.

SAS Rapid Predictive Modeler, Overview, 2010, 4 pages.

Postema, et al., "A Decision Support Tool for Tuning Parameters in a Machine Learning Algorithm", Nanyang Techonological University, 1997, 9 pages.

"Active learning (machine learning)," Wikipedia, the free encyclopedia, [online] [retrieved on Sep. 8, 2011]. Retrieved from the Internet: http://en.wikipedia.org/wiki/Active learning (machine learning), 3 pages.

* cited by examiner

SUGGESTING TRAINING EXAMPLES

CROSS-REFERENCE TO RELATED APPLICATIONS

This application claims priority to U.S. application Ser. No. 13/228,365, filed on Sep. 8, 2011 entitled "SUGGESTING TRAINING EXAMPLES," which claims the benefit of priority under 35 U.S.C. §119(e) to U.S. Provisional Application Ser. No. 61/497,481, filed on Jun. 15, 2011 entitled "SUGGESTING TRAINING EXAMPLES," the entirety of which is hereby incorporated by reference.

BACKGROUND

This specification relates to predictive models.

Predictive modeling generally refers to techniques for extracting information from data to build a model that can predict an output from a given input. Predicting an output can include predicting future trends or behavior patterns, or performing sentiment analysis, to name a few examples. Various types of predictive models can be used to analyze data and generate predictive outputs. Examples of predictive models include Naive Bayes classifiers, k-nearest neighbor classifiers, support vector machines, and logistic regression techniques, for example. Typically, a predictive model is trained with training data that includes input data and output data that mirror the form of input data that will be entered into the predictive model and the desired predictive output, respectively. The amount of training data that may be required to train a predictive model can be large, e.g., in the order of gigabytes or terabytes. The number of different types of predictive models available is extensive, and different models behave differently depending on the type of input data. Additionally, a particular type of predictive model can be made to behave differently, for example, by adjusting the hyper-parameters or via feature induction or selection.

SUMMARY

This specification describes technologies relating to suggesting training examples for machine learning. Multiple machine learning algorithms can be used to build respective models for a single collection of training data. The performance of the respective models can be calculated to determine which model is most suitable for the given training data.

The models can generally be improved by increasing the number of training examples in the training data. However, certain training examples may improve the performance of a model more than other training examples. For example, a collection of training data may have a relatively small number of training examples for a particular category or feature space. Therefore, the quality of a particular model can be improved by increasing the number of training examples for a particular category or feature space with a relatively small number of training examples.

In various implementations, a machine learning system can identify training examples in a given collection of training data to suggest to, e.g., an operator of the system as particularly useful training examples. The identified training examples can be ranked to represent which training examples would be most useful. The suggestion of such identified training examples can prompt the operator to provide more training examples like those identified.

In general, one innovative aspect of the subject matter described in this specification can be embodied in methods that include the actions of receiving a plurality of training examples; training a plurality of different types of predictive models using the received training examples, wherein each of the predictive models implements a different machine learning technique; measuring the performance of each trained model; computing a suggestion score for each training example according to each respective trained model, including weighting each suggestion score by the measured performance of the respective trained model; combining the computed suggestion scores for each training example to compute an overall suggestion score for each training example; and ranking the training examples by suggestion scores. Other embodiments of this aspect include corresponding systems, apparatus, and computer programs, configured to perform the actions of the methods, encoded on computer storage devices.

These and other embodiments can each optionally include one or more of the following features. One or more of the ranked training examples is provided to a user as a suggestion to add examples similar to the ranked training examples. A number of highest-ranked training examples is provided in response to a request. An ambiguity score is computed for each training example, including comparing the answer distribution for a training example between two or more categories, and wherein computing the suggestion score for each training example comprises using the computed ambiguity score. A difficulty score is computed for each training example, including comparing a confidence associated with an incorrectly predicted category to a threshold, and wherein computing the suggestion score for each training example comprises using the computed difficulty score. A sparseness score is computed for each training example, including computing a count of a particular training example and comparing the count to a threshold, and wherein computing the suggestion score for each training example comprises using the computed sparseness score. A sparseness score is computed for each training example, including computing a distribution of training example answers and comparing the answer of a particular training example to the distribution, and wherein computing the suggestion score for each training example comprises using the computed sparseness score. A user-defined utility is received for each of one or more predicted categories, wherein utility is a measure of importance for the category, and the utility of a category to which a particular training example is predicted is used in computing the suggestion score for each training example. One or more additional training examples is received, each trained model is updated after each additional training example is received, and the highest-ranked training examples by suggestion score are updated after each additional training example is received.

Particular embodiments of the subject matter described in this specification can be implemented so as to realize one or more of the following advantages. Suggesting training examples can help operators of a machine learning system to quickly and efficiently build better models. Calculating suggestion scores for training examples can identify training examples that are most useful for a trained model. Providing a user with the reason or reasons that a particular training example has a high suggestion score can help the user understand the trained model.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In various implementations, a predictive model (or "model") is either a categorical model if its predictions are categories, or is a regression model if its predictions are numeric. A predictive model is trained using training data. Training data encompasses examples that each comprise an [x, y] pair of one or more data fields (x) plus an answer (y, which is a category or a numeric value) for that example. By way of illustration, the training data in TABLE 1 consists of training examples for a predictive model that classifies given text into a particular language. The data field (x) is a snippet of text, and the answer (y) is the language of the text.

TABLE 1

| TEXT | LANGUAGE |
| --- | --- |
| "Good morning" | English |
| "Buon giorno" | Italian |
| "Buenos dias" | Spanish |
| "Bonjour" | French |

After a model has been trained against training data, queries can be submitted to the model. In some implementations, queries are similar in form to training examples: that is, a query has the same or fewer data fields as the training examples but does not include an answer. The trained model uses patterns learned from the training data to either find the closest category for the submitted query (if it is a categorical model) or estimate a value for the query (if it is a regression model). For example, after training the model, a query containing "Good day" can be submitted to the model. The model can then be used to classify the text in the query as being in a particular language, e.g., English.

Another example set of training data is attributes of a house (x) and the market value of the house (y). The attributes (x) can include the number of rooms in the house, the square footage of the house, the geographic location of the house, etc. After being trained with the training data, the model can be used to assign a predicted market value of the house, given one or more of the attributes used in training. Unlike the language classifier example, a numeric value is returned in response to a query instead of a particular category.

Another example set of training data is one or more selected items (x) and an additional item (y). After being trained, a model can be used to make recommendations given a selected item. For example, a query can be submitted to the model that includes a purchased item, e.g. "DVD player." In response, the model can identify "television" as a recommended product. For another example, a query can be submitted to the model that includes a selected movie, e.g. "Casablanca." In response, the model can identify "Citizen Kane" as a recommended movie.

Figure 1:
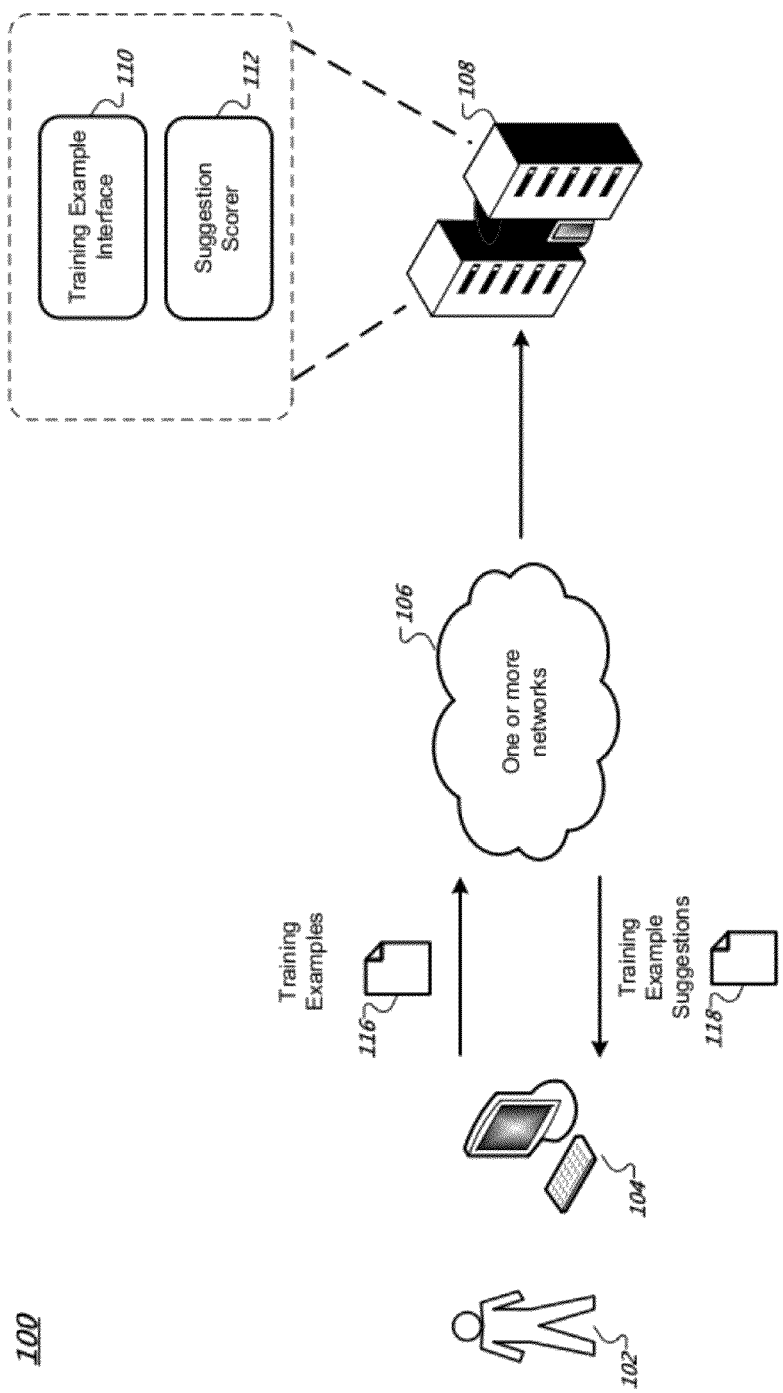
FIG. 1 illustrates receiving training examples and returning suggested training examples for an example system.

FIG. 1 illustrates receiving training examples and returning suggested training examples for an example system 100. A user 102 interacts with a client computing device 104 (or "client") to access a training example interface 110 for providing training examples 116 to the system and for receiving suggested training examples 118 from the system. The training example interface 110 can be a web application executing on one or more server computing devices (or "servers") that are accessed over a network 106, such as the Internet, by the user 102. Software that implements the training example interface 110 executes on one or more servers in a data warehouse 108, for instance, that houses hundreds or thousands of servers. The user 102 can interact with the training example interface 110 by using a web browser or other software that executes on the client 104. User data files including training examples 116 received by the training example interface 110 can be stored in repositories that are accessible to the servers. The training example interface 110 can provide a graphical user interface (GUI) to the client 104 by sending the client 104 Hypertext Markup Language (HTML) documents or other information that can be used to render the GUI.

Received training examples 116 can be used by a predictive modeling system (described with respect to FIG. 2) to train respective models according to multiple machine learning algorithms. The models can be trained in an online fashion, such that the model can be updated after each individual training example 116 is received. After the models are trained, a suggestion scorer 112 can compute a suggestion score for each received training example 116. A number of the training examples with the highest suggestion scores can be returned to the user 102 as training example suggestions 118. Likewise, the returned training example suggestions 118 can be updated after each individual training example 116 is received. The returned training example suggestions 118 can indicate to the user that the model can be improved by providing additional training examples similar to the returned training example suggestions 118.

Figure 2:
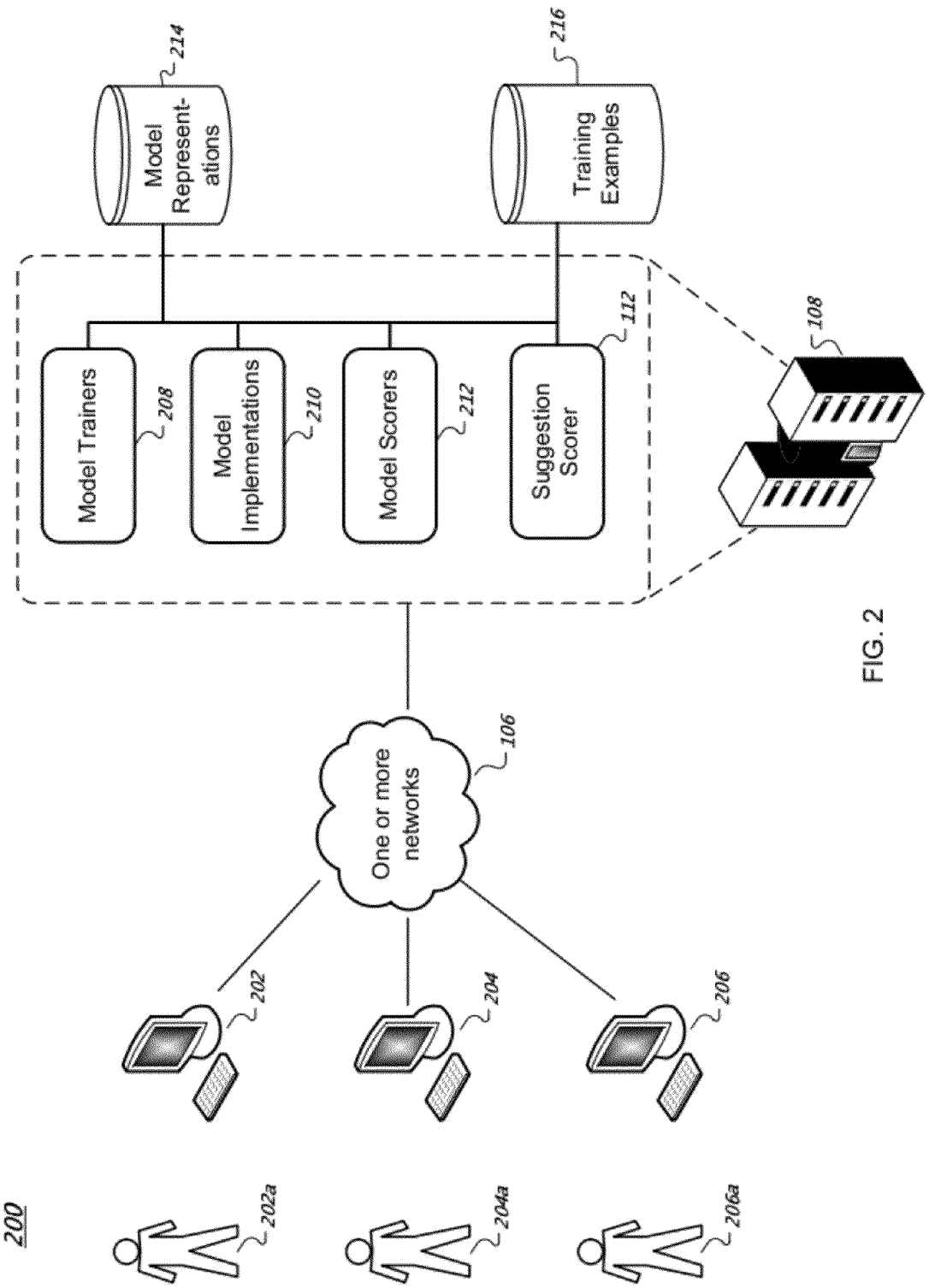
FIG. 2 illustrates an example predictive modeling system.

FIG. 2 illustrates an example predictive modeling system 200. The system 200 includes one or more clients (e.g., clients 202, 204 and 206) that can communicate through one or more networks 106 with a collection of remote servers, such as servers deployed in a data center 108 or in different geographic locations. A given server comprises one or more data processing apparatus. The servers can communicate with each other and with storage systems (e.g., model representation storage system 214 and training example storage system 216) at various times using one or more computer networks or other communication means. For example, the servers in the data center 108 can be coupled to an intranet. A computer program can execute on a single server or, alternatively, the program can be organized into components that execute on multiple servers. There can be more than one instance or copy of a given computer program executing on the collection of servers at any given time. Multiple copies of a computer program that implement a model implementation or a model executor, for instance, can be executing at the same time on one or more servers.

Computer programs can be executed in parallel by the servers. Two computer programs are executed in parallel if they are executed on different servers and if at least a portion of their execution occurs at the same time. For example, assume that computer program A is executed on server S1 and computer program B is executed on server S2. If some period of time exists where program A and B are both being executed, then the programs are executed in parallel.

The servers execute computer programs that implement model trainers 208, model implementations 210, model scorers 212, and a suggestion scorer 112. The model trainers 208 can use the training examples 216 to build a model for each of multiple machine learning algorithms. The trained models can be stored as model representations 214. In some implementations, a model representation is a Predictive Model Markup Language (PMML) document. PMML is an eXtensible Markup Language (XML)-based language. Other model representations are possible such as, for example, formatted or unformatted text. The PMML specification is an XML schema. Instances of models are XML documents that conform to the schema. A PMML document can represent more than one possible model.

The model representations 214 can be used to invoke model implementations 210, which are computer programs that execute on one or more servers, each according to a model representation 214. For example, a model implementation 210 can be a computer program that is designed to execute on a single server or it can be designed to execute on multiple servers. An example of the later approach is a model implemented as a map-reduce system. A map-reduce system includes application-independent map modules configured to read input data and to apply at least one application-specific map operation to the input data to produce intermediate data values. The map operation is automatically parallelized across multiple servers. Intermediate data structures are used to store the intermediate data values. Application-independent reduce modules are configured to retrieve the intermediate data values and to apply at least one application-specific reduce operation to the intermediate data values to provide output data. The map-reduce system is described further in U.S. Pat. No. 7,650,331, entitled "System and method for efficient large-scale data processing," which is incorporated by reference herein in its entirety.

Model scorers 212 can measure the performance of each model implementation 210. In some implementations, the performance of a model implementation 210 is measured by setting aside a subset of training examples 216, the set-aside data referred to as heldout data. The model trainers 208 train the models according to the remaining data, and the model scorers 212 then use the heldout data to test the performance of the model implementations 210. An example of measured performance of a model implementation for a language classifier is how many text snippets are correctly classified by language. In some implementations, using heldout data to measure the performance of a trained model can diminish the effect of overfitting the training examples.

The suggestion scorer 112 can be implemented as one or more computer programs executing on one or more servers. The suggestion scorer 112 can compute, for each of the training examples 116, a suggestion score. In some implementations, the suggestion scorer can compute multiple types of suggestion scores and combine the computed suggestion scores into a single overall suggestion score. The suggestion scorer 112 can use the performance of a model as computed by the model scorers 212 in determining one or more suggestion scores for each training example. The suggestion scorer 112 can store a number of possible training examples with the highest suggestion scores in the training example storage subsystem 216.

Figure 3:
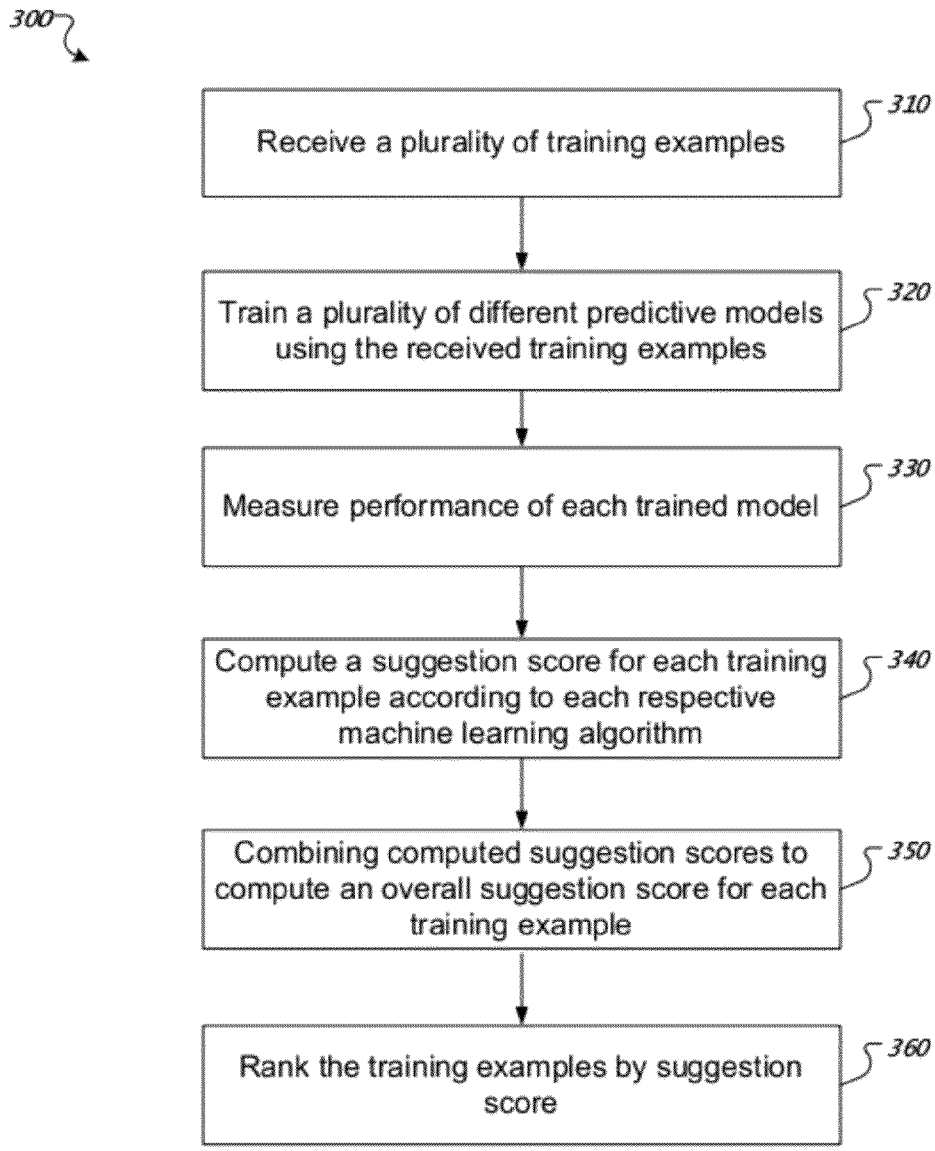
FIG. 3 is a flowchart of an example process for computing suggestion scores for training examples.

FIG. 3 is a flowchart of an example process 300 for computing suggestion scores for training examples. The process 300 will be described as being performed by a computer system of one or more computers, e.g., data warehouse 108 implementing model builders 208, model implementations 210, model scorers 212, and a suggestion scorer 112.

The system (e.g., predictive modeling system 200) receives a plurality of training examples (310). The training examples can be received from a client device over a network, and can be received through a training example interface, e.g. training example interface 110. Each training example can include an [x, y] pair including a set of data fields (x) and an answer (y).

The system trains (e.g., using model trainers 208) a plurality of different predictive models using the received training examples (320). Using the received training examples, the system can build multiple models, each according to a different machine learning algorithm. The models can be implemented as model implementations (e.g., model implementations 210) running as computer programs that respond to received queries with a prediction for each received query. For example, a model implementation can respond to a received query including a text snippet with a prediction about the language of the text snippet.

The system measures the performance of each trained model (e.g., using model scorers 212) (330). In some implementations, the system uses heldout data to compute the performance of the model by setting aside a portion of the training data as heldout data and using the remaining training data to train each model. The training examples in the heldout data can then be used to test the model by using the data fields (x) as queries and then comparing the predicted answer with the answer of the training example (y). The system can use a different portion of training examples as heldout data for multiple rounds. For example, 20% of the training data can be used as heldout data for testing the performance of the model. The system can train the model on the remaining 80% of the data on five different rounds, using a different subset of training data as heldout data on each round. The system can then average the performance over each round to compute an overall measure of performance for each trained model. For example, the performance for a language classifier model can be the number of training examples (e.g. 80%) that were correctly classified according to the trained model. The performance of a house value prediction model can be the number of training examples whose predicted values were within a predetermined threshold of the given answer.

In some implementations, instead of returning a single answer in response to a query, a model implementation returns multiple answers, each with an associated weight. In some implementations, the weight is a computed probability that the corresponding answer is correct.

For example, for a query "morning", a language classifier model can return the following distribution of answers and associated weights:

English: 0.95
German: 0.03
Spanish: 0.01
French: 0.01

In addition, the system can compute a confidence (e.g. using the model trainers 208) for the entire distribution. For example, the system can assign a confidence of 90% for the above particular answer distribution. In the case of a regression model, the system can return a single numeric answer and can assign a confidence to the numeric answer, for instance. The computed answer distributions and confidences can be used by the system to compute suggestion scores for each training example, as described in more detail below.

The system computes a suggestion score (e.g., using suggestion scorers 218) for each training example according to each respective machine learning algorithm (340). In some implementations, the suggestion score can be based on one or more factors that indicate that additional examples similar to the particular training example being scored would be likely to improve the performance of the model. The system can compute a separate score for each of multiple factors and then combine the scores into an overall suggestion score.

The system need not compute a suggestion score for every training example and can instead compute suggestion scores for only a subset of received training examples in order to conserve computational resources. In some implementations, the system can randomly recombine training examples and compute suggestion scores for only the randomly recombined training examples. For example, the system can recombine the data field "Good morning" from one training example with the answer "French" from another training example. The system can then compute suggestion scores for the recombined training examples and request more examples similar to those training examples with high suggestion scores. The system can also compute suggestion scores as the system makes predictions for received queries. For a received query with a sufficiently high suggestion score, the system can invite the user to provide the correct answer for the received query. The query and corrected answer can then be used as a training example to update the trained models.

The system can also save computational resources by computing suggestion scores for a subset of the training examples and then by computing additional suggestion scores only for other training examples near high-scoring training examples from the subset. For example, if training example A was in the scored subset, the system can identify another training example B that is near to A according to an appropriate distance metric. In some implementations, the system can use a nearest-neighbor search algorithm to identify training examples that are near those training examples in the scored subset.

An example factor used for computing a suggestion score is an ambiguity score. The ambiguity score is a measure of uncertainty for a particular training example. For example, a training example that is between two categories or for which the computed confidence is low can have a high ambiguity score.

In some implementations, the ambiguity score is determined by computing the difference in predicted weight between the two categories with the most significant weights. For example, for the received training example "rodeo", a language classifier can return the following weight distribution:

English: 0.49
Spanish: 0.50
French: 0.01

In this case, the difference between the two categories (English and Spanish) with the most significant weights is small. In some implementations, if this difference is below a threshold, the ambiguity score will be increased. The system can also increase the ambiguity score if the confidence for a particular distribution is low or below a threshold.

Another example factor for a suggestion score is a difficulty score. The difficulty score is a measure of how difficult the training example was to classify or predict. In some implementations, the system considers training examples that were very wrong to have high difficulty scores. For example, a system can consider a training example labeled as "English" difficult if the predicted categories and weights were:

Spanish: 0.90
French: 0.05

In other words, the weight for Spanish was overwhelming despite the given answer being English. In some implementations, the system determines the difficulty score by computing the difference between the category with the most significant weight and the weight of the correct answer category. The system can increase the difficulty score if the difference is above a threshold. The system can also increase the difficulty score if the confidence for a particular distribution is high or above a threshold despite an incorrect prediction.

Another example factor for a suggestion score is a sparseness score. The sparseness score is a measure of the volume of a particular training example category or feature space. For countable training examples, a number of times a category, e.g., "Portuguese" appears in the training examples, the system can compute the sparseness score based on the number of such training examples. The system can increase the sparseness score if the number of training examples is below a threshold. For numeric training examples, e.g. house prices, the system can compute the sparseness score based on a distribution of the training examples. The system can increase the sparseness score if a particular training example lies outside the range of a particular distribution. For example, if a training example has a given answer for house price as $150 Million, and the majority of house prices in the training examples are below $1 Million, the system can increase the sparseness score for that training example accordingly. Other factors are possible.

The system combines the computed suggestion scores (e.g., using the suggestion scorer 112) to compute an overall suggestion score for each training example (350). In some implementations, the system can add the ambiguity score, difficulty score, and sparseness score for each training algorithm. In other words, the score $S(x_i, y_i)$, for a given training example with input data $x_i$ and answer $y_i$, can be given by $$S(x_i, y_i) = \sum^M a_i + \sum^M d_i + \sum^M s_i,$$

where $a_i$ is the ambiguity score, $d_i$ is the difficulty score, and $s_i$ is the sparseness score computed according to models generated by each of M training algorithms. Other combinations of factors are possible.

Another example factor for a suggestion score is a utility of the predicted categories (or numerical range in the case of a regression model). A utility can be a user-defined importance of a particular predicted category or numerical range. For example, a user can specify that English and French are the two most important languages for a set of training examples for training a particular language classifier. The training examples predicted to be English or French can therefore be considered more important than training examples predicted in other languages. In some implementations, for each training example, the system weights any or all of the ambiguity scores, difficulty scores, and sparseness scores by the user-defined utility $U(C_i)$ of the training example's predicted category $C_i$ as:

$$S(x_i, y_i) = \sum^M a_i U(C_i) + \sum^M d_i U(C_i) + \sum^M s_i U(C_i).$$

In addition, in some implementations the system weights each score by the measured performance P of each of the M training algorithms as:

$$S(x_i, y_i) = \frac{\sum_k^M a_i P_k U(C_i)}{\sum_k^M P_k} + \frac{\sum_k^M d_i P_k U(C_i)}{\sum_k^M P_k} + \frac{\sum_k^M s_i P_k U(C_i)}{\sum_k^M P_k}$$

In some implementations, the system multiplies the sum of each score by a constant, which can be derived empirically.

$$S(x_i, y_i) = A \cdot \frac{\sum_{k}^{M} a_i P_k U(C_i)}{\sum_{k}^{M} P_k} + D \cdot \frac{\sum_{k}^{M} d_i P_k U(C_i)}{\sum_{k}^{M} P_k} + S \cdot \frac{\sum_{k}^{M} s_i P_k U(C_i)}{\sum_{k}^{M} P_k},$$

where A is a constant for the sum of ambiguity scores, D is a constant for the sum of difficulty scores, and S is a constant for the sum of sparseness scores.

The system ranks the training examples by suggestion score (e.g., using suggestion scorer 112) (360). The system can return a number of the highest-ranked training examples as suggestions. In some implementations, the system can use the training example interface 110 to provide a graphical interface that presents the highest-ranked training examples. The system can also indicate the reason that a particular high-ranking training example is being suggested. For example, the system can indicate that a particular training example (e.g. "rodeo") had a high ambiguity score because it was between two categories. For another example, the system can indicate that a particular category (e.g. "Portuguese") was found in the training examples a small number of times.

The system can store the highest-ranked training examples, both overall, and for each factor (e.g. ambiguity score, difficulty score, etc.). The system can receive a query from a user for the highest-ranked training examples, and in response to the query, can provide the highest-ranked training examples to a user. The system can use the training example interface 110 to provide a presentation of the highest-ranked training examples. The presentation of the highest-ranked training examples can include an explanation for why each training example was highly ranked. The explanation can include a description of which factor or factors were most significant in the suggestion score for the training example. For example, the explanation can indicate that a particular training example had a high ambiguity score.

Figure 4:
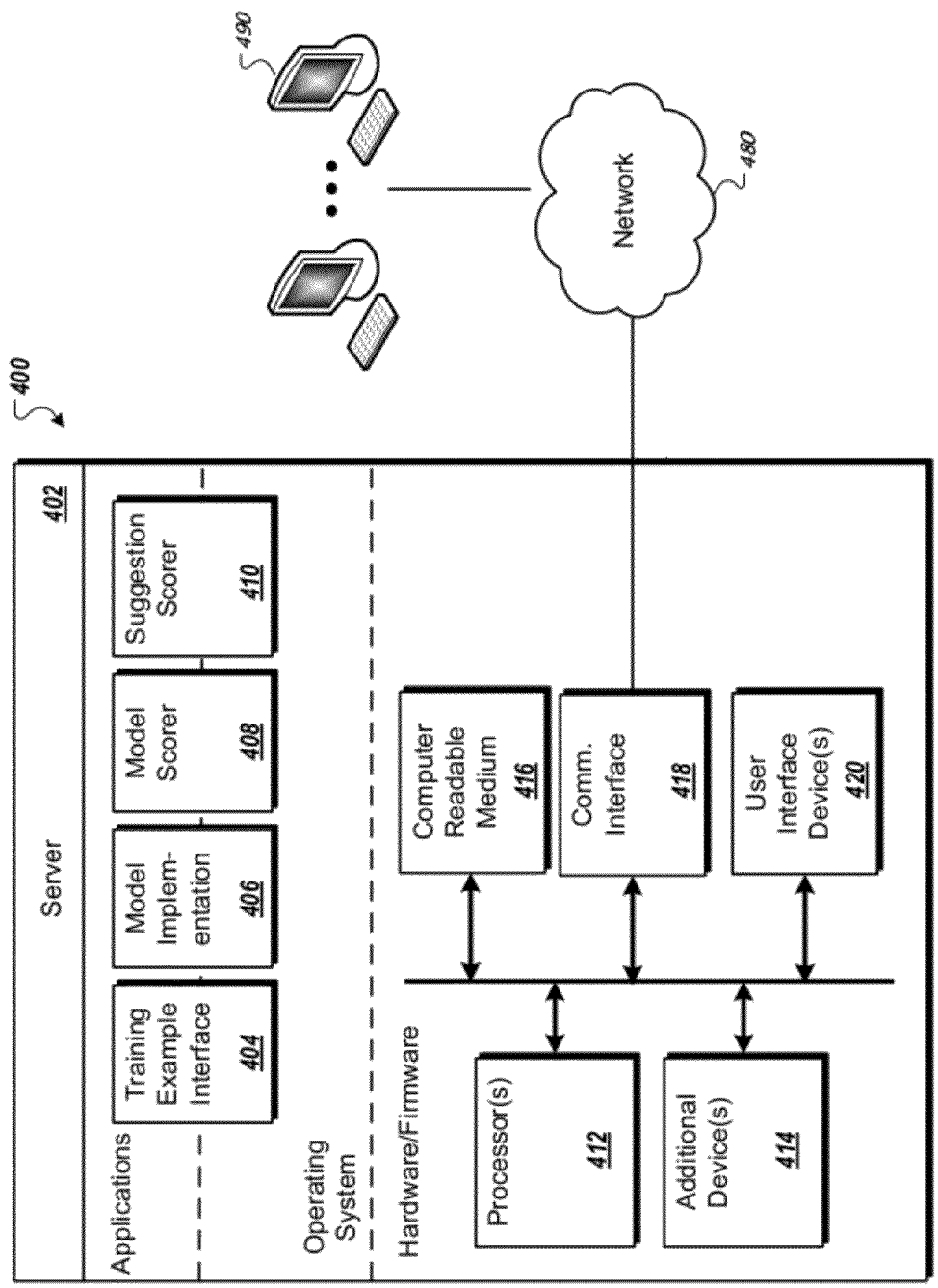
FIG. 4 is a schematic diagram of an example server.

FIG. 4 is a schematic diagram of an example server 402. The server 402 is optionally connected to one or more user or client computers 490 through a network 480. The server 402 consists of one or more data processing apparatuses. While only one data processing apparatus is shown in FIG. 4, multiple data processing apparatus can be used. The server 402 includes various software modules, e.g. executable software programs or libraries, including one or more of: a training example interface 404, a model implementation 406, a model scorer 408, and a suggestion scorer 410. Although several software modules are illustrated, there may be fewer or more software modules. Moreover, the software modules can be distributed on one or more data processing apparatus connected by one or more networks or other suitable communication mediums.

The server 402 also includes hardware or firmware devices including one or more processors 412, one or more additional devices 414, a computer readable medium 416, a communication interface 418, and one or more user interface devices 420. Each processor 412 is capable of processing instructions for execution within the server 402. In some implementations, the processor 412 is a single or multi-threaded processor. Each processor 412 is capable of processing instructions stored on the computer readable medium 416 or on a storage device such as one of the additional devices 414. The server 402 uses its communication interface 418 to communicate with one or more computers 490, for example, over a network 480. Examples of user interface devices 420 include a display, a camera, a speaker, a microphone, a tactile feedback device, a keyboard, and a mouse. The server 402 can store instructions that implement operations associated with the modules described above, for example, on the computer readable medium 416 or one or more additional devices 414, for example, one or more of a floppy disk device, a hard disk device, an optical disk device, or a tape device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A computer-implemented method comprising:
    receiving a plurality of training examples;

training a plurality of different types of predictive models using the received training examples, wherein each of the predictive models implements a different machine learning technique;

measuring the performance of each trained model;

computing a suggestion score for each training example according to each respective trained model, wherein the suggestion score is based on one or more factors that indicate whether additional examples similar to the training example would improve the performance of the model, including weighting each suggestion score by the measured performance of the respective trained model;

combining the computed suggestion scores for each training example to compute an overall suggestion score for each training example; and ranking the training examples by overall suggestion scores.

2. The method of claim 1, further comprising:

providing one or more of the highest-ranked training examples to a user as a suggestion to add examples similar to one or more highest-ranked training examples.

3. The method of claim 1, further comprising providing a number of highest-ranked training examples in response to a request.

4. The method of claim 1, wherein one of the one or more factors is an ambiguity score, wherein the ambiguity score is based on a confidence of an answer distribution for a training example.

5. The method of claim 1, wherein one of the one or more factors is a difficulty score, wherein the difficulty score for a particular training example is based on a confidence associated with an incorrectly predicted category for the particular training example.

6. The method of claim 1, wherein one of the one or more factors is a sparseness score, wherein the sparseness score for a particular training example is based on a count of a category of the particular training example.

7. The method of claim 1, wherein one of the one or more factors is a sparseness score, wherein the sparseness score for a particular training example is based on comparing a distribution of training example answers to the answer of the particular training example.

8. The method of claim 1, further comprising:

receiving a user-defined utility for each of one or more predicted categories, wherein the utility is a measure of importance for a category; and using the utility of a category to which a particular training example is predicted in computing the suggestion score for each training example.

9. The method of claim 1, further comprising:

receiving one or more additional training examples;

updating each trained model after each additional training example is received; and updating the highest-ranked training examples by suggestion score after each additional training example is received.

10. A system comprising:

one or more data processing apparatus; and a computer-readable storage device having stored thereon instructions that, when executed by the one or more data processing apparatus, cause the one or more data processing apparatus to perform operations comprising:

receiving a plurality of training examples;

training a plurality of different types of predictive models using the received training examples, wherein each of the predictive models implements a different machine learning technique;

measuring the performance of each trained model;

computing a suggestion score for each training example according to each respective trained model, wherein the suggestion score is based on one or more factors that indicate whether additional examples similar to the training example would improve the performance of the model, including weighting each suggestion score by the measured performance of the respective trained model;

combining the computed suggestion scores for each training example to compute an overall suggestion score for each training example; and ranking the training examples by overall suggestion scores.

11. The system of claim 10, wherein the operations further comprise:

providing one or more of the highest-ranked training examples to a user as a suggestion to add examples similar to one or more highest-ranked training examples.

12. The system of claim 10, wherein the operations further comprise providing a number of highest-ranked training examples in response to a request.

13. The system of claim 10, wherein one of the one or more factors is an ambiguity score, wherein the ambiguity score is based on a confidence of an answer distribution for a training example.

14. The system of claim 10, wherein one of the one or more factors is a difficulty score, wherein the difficulty score for a particular training example is based on a confidence associated with an incorrectly predicted category for the particular training example.

15. The system of claim 10, wherein one of the one or more factors is a sparseness score, wherein the sparseness score for a particular training example is based on a count of a category of the particular training example.

16. The system of claim 10, wherein one of the one or more factors is a sparseness score, wherein the sparseness score for a particular training example is based on comparing a distribution of training example answers to the answer of the particular training example.

17. The system of claim 10, wherein the operations further comprise:

receiving a user-defined utility for each of one or more predicted categories, wherein the utility is a measure of importance for a category; and using the utility of a category to which a particular training example is predicted in computing the suggestion score for each training example.

18. The system of claim 10, wherein the operations further comprise:

receiving one or more additional training examples;

updating each trained model after each additional training example is received; and updating the highest-ranked training examples by suggestion score after each additional training example is received.

19. A computer-readable storage device having stored thereon instructions, which, when executed by data processing apparatus, cause the data processing apparatus to perform operations comprising:
- receiving a plurality of training examples;
- training a plurality of different types of predictive models using the received training examples, wherein each of the predictive models implements a different machine learning technique;
- measuring the performance of each trained model;
- computing a suggestion score for each training example according to each respective trained model, wherein the suggestion score is based on one or more factors that indicate whether additional examples similar to the training example would improve the performance of the model, including weighting each suggestion score by the measured performance of the respective trained model;
- combining the computed suggestion scores for each training example to compute an overall suggestion score for each training example; and
- ranking the training examples by overall suggestion scores.

20. The storage device of claim 19, wherein the operations further comprise:
- providing one or more of the highest-ranked training examples to a user as a suggestion to add examples similar to one or more highest-ranked training examples.

21. The storage device of claim 19, wherein the operations further comprise providing a number of highest-ranked training examples in response to a request.

22. The storage device of claim 19, wherein of the one or more factors is
- an ambiguity score, wherein the ambiguity score is based on a confidence of an answer distribution for a training example.

23. The storage device of claim 19, wherein one of the one or more factors is
- a difficulty score, wherein the difficulty score for a particular training example is based on a confidence associated with an incorrectly predicted category for the particular training example.

24. The storage device of claim 19, wherein one of the one or more factors is
- a sparseness score, wherein the sparseness score for a particular training example is based on a count of a category of the particular training example.

25. The storage device of claim 19, wherein one of the one or more factors is
- a sparseness score, wherein the sparseness score for a particular training example is based on comparing a distribution of training example answers to the answer of the particular training example.

26. The storage device of claim 19, wherein the operations further comprise:
- receiving a user-defined utility for each of one or more predicted categories, wherein the utility is a measure of importance for a category; and
- using the utility of a category to which a particular training example is predicted in computing the suggestion score for each training example.

27. The storage device of claim 19, wherein the operations further comprise:
- receiving one or more additional training examples;
- updating each trained model after each additional training example is received; and
- updating the highest-ranked training examples by suggestion score after each additional training example is received.

\* \* \* \* \*

UNITED STATES PATENT AND TRADEMARK OFFICE
CERTIFICATE OF CORRECTION

PATENT NO.        : 8,244,651 B1                                             Page 1 of 1
APPLICATION NO.   : 13/245688
DATED             : August 14, 2012
INVENTOR(S)       : Wei-Hao Lin et al.

It is certified that error appears in the above-identified patent and that said Letters Patent is hereby corrected as shown below:

Column 15, Line 31 at Claim 22; replace:
"22. The storage device of claim 19, wherein of the one or" with
-- 22. The storage device of claim 19, wherein one of the one or --

Signed and Sealed this
Eighteenth Day of December, 2012

David J. Kappos
*Director of the United States Patent and Trademark Office*